United States Patent
Chen

(10) Patent No.: US 7,344,147 B2
(45) Date of Patent: Mar. 18, 2008

(54) LOCKING DEVICE OF A FRONT FORK WITH SHOCK ABSORBER AND RELEASING PRESSURE STRUCTURE THEREWITH

(75) Inventor: Leo Chen, Taichung (TW)

(73) Assignee: Spinner Ind. Co., Ltd., Taichung (TW)

( * ) Notice: Subject to any disclaimer, the term of this patent is extended or adjusted under 35 U.S.C. 154(b) by 88 days.

(21) Appl. No.: 11/307,097

(22) Filed: Jan. 23, 2006

(65) Prior Publication Data

US 2007/0170689 A1 Jul. 26, 2007

(51) Int. Cl.
*B62K 21/02* (2006.01)
(52) U.S. Cl. ........................ 280/276; 280/275
(58) Field of Classification Search ................ 280/276, 280/275, 277, 279
See application file for complete search history.

(56) References Cited

U.S. PATENT DOCUMENTS 4,881,750 A * 11/1989 Hartmann .................... 280/276
7,163,222 B2 * 1/2007 Becker et al. ............... 280/276
2001/0040078 A1 * 11/2001 Gonzalez et al. .......... 188/319.2
2004/0046354 A1 * 3/2004 Turner et al. ............... 280/276

* cited by examiner

Primary Examiner—Lesley D. Morris
Assistant Examiner—Maurice Williams
(74) Attorney, Agent, or Firm—Banger Shia

(57) ABSTRACT

A locking device of a front fork with shock absorber and releasing pressure structure therewith, when users came across accidented terrain while riding and the buffering function of the front fork is turned off, the counterforce is transmitted to the front fork and exceeded the threshold value of the hydraulic oil, so that the damper and the plug piece move upwardly to compress the elastic member and the through holes of the damper are opened to make the hydraulic oil of the lower fork tube flow to the upper fork tube, thus the upper and lower fork tubes can be moved oppositely. When the counterforce is less than the minimum force of compressing the elastic member, the elastic member is pressed against the plug piece, and the damper can be repositioned and the through holes will be closed again.

1 Claim, 6 Drawing Sheets

LOCKING DEVICE OF A FRONT FORK WITH SHOCK ABSORBER AND RELEASING PRESSURE STRUCTURE THEREWITH

BACKGROUND OF THE INVENTION

1. Field of the Invention

The present invention relates to a front fork with shock absorber of a bicycle, and more particularly to a locking device of a front fork with shock absorber and releasing pressure structure therewith.

2. Description of the Prior Art

When riding to the ascent, since a front fork with shock absorber structure of a bicycle can absorb tread strength of the rider, the rider will feel very laborious and physical vigor is easier to be expended. Therefore, in order to solve the said problems, a front fork that can be adjusted the buffering effects according to the rider is needed.

A case of an adjustable suspension system for anti-locking a front fork of patent gazette of Republic of China 92204768 is described as follows:

State of locking the front fork: since rotating an adjusting cover that can be positioned a connecting base, meanwhile, the connecting base can drive an adjusting bolt to rotate, and an engaging block can be risen so as to seal a injecting hole that is defined in a oil wrapper of a lower edge of a first oil room, thereby the return passage of the first oil room and a second oil room will be blocked, and the damping of oil pressure will useless.

State of anti-locking: when the momentary oil pressure of the second oil room is bigger than the backing force of a spring of the first oil room, the oil pressure of the second oil room will be against the oil wrapper for compressing the spring of the first oil room, thereby the injecting mouth of the oil wrapper will not be blocked by the engaging block, and made the two oil rooms opened. When the pressure is in normal conditions, the front fork will be locked again.

The said prior art is able to adjust the front fork with buffering effect or not. When the front fork is locked and has no shock proof effect, the oil pressure value of the tubes can be adjusted appropriately so as to avoid damaging the members.

The members that is small and easily assembling are easier to reduce the costs and improve the efficiency. For example, shorten the spring of the first oil room, which can reduce the costs and the whole weight and volume. However, the oil wrapper is stopped up the inner tube by cooperating with an anti-oil ring, which is difficult to assemble. And the inclined surface of the engaging block must be very precise to the size of the injecting mouth of the oil wrapper so as to prevent the injecting hole from leaking.

The present invention has arisen to mitigate and/or obviate the afore-described disadvantages.

SUMMARY OF THE INVENTION

The primary objective of the present invention is to provide a locking device of a front fork with shock absorber and releasing pressure structure therewith, which is low costs and easily assembling. When users came across accidented terrain while riding and the front fork has no shock proof effect, the counterforce will be transmitted to the front fork so as to avoid damaging the members of the locking device.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
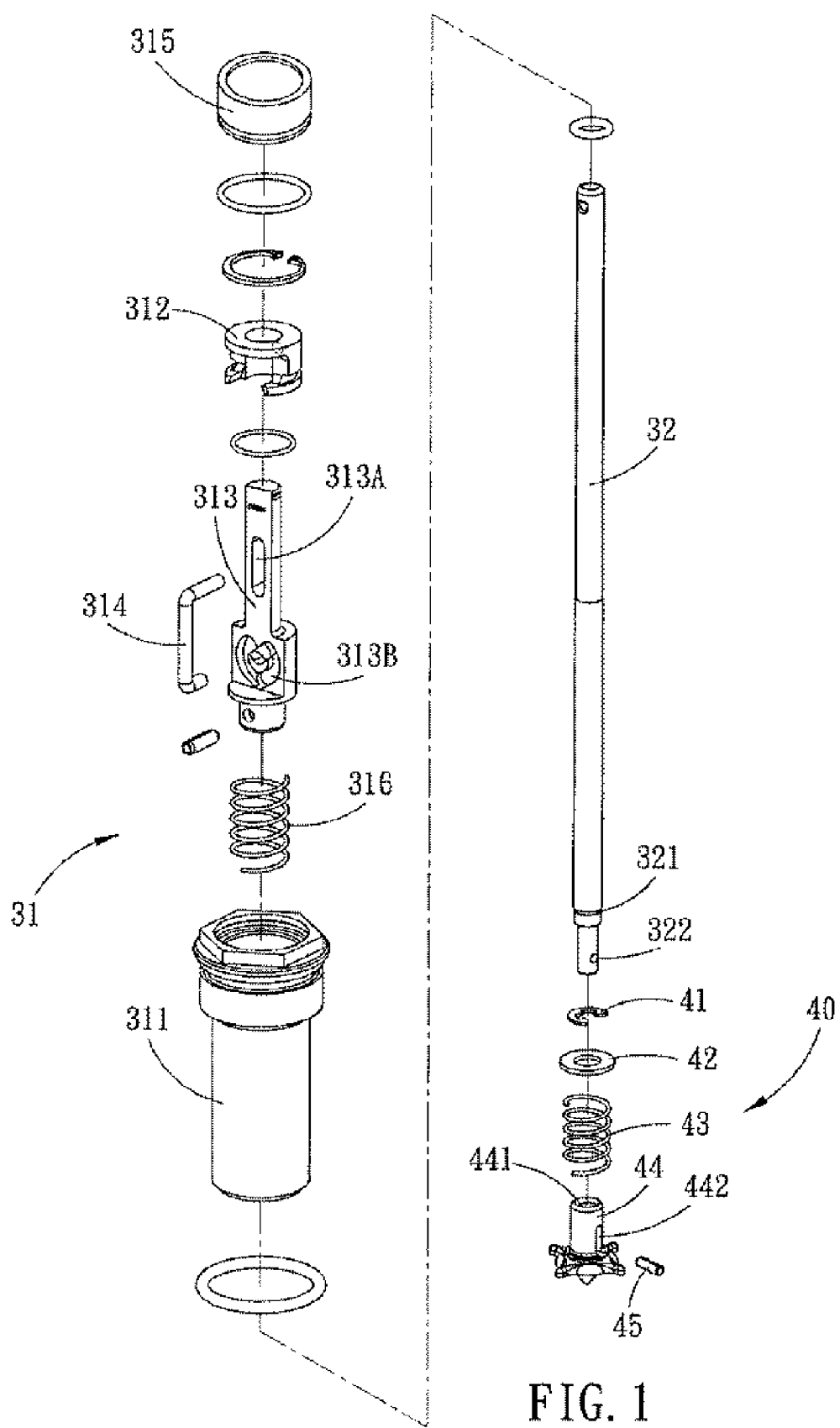
FIG. 1 is an exploded view of a locking device of a front fork with shock absorber in accordance with the present invention.
Figure 2:
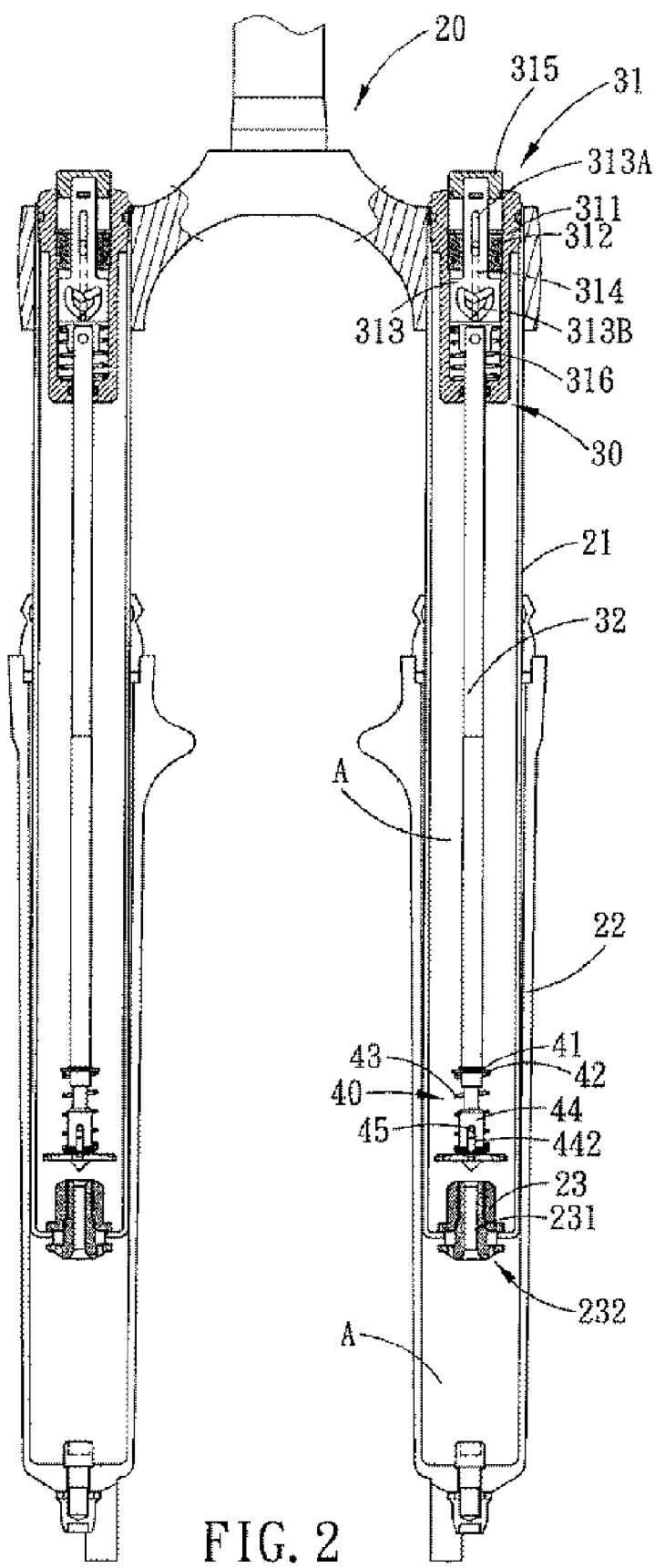
FIG. 2 is a cross sectional view of a locking device of a front fork with shock absorber in accordance with the present invention.

Referring to FIGS. 1 and 2, a locking device of a front fork with shock absorber and releasing pressure structure therewith in accordance with the present invention, wherein a front fork 20 comprises an upper fork tube 21 and a lower fork tube 22 that are telescopically and movably engaged with each other. The front fork 20 is installed with hydraulic oil A, and in the lower end of the upper fork tube 21 is formed a movable damper 23 having a passage 231 for flowing of the hydraulic oil A and a plurality of through holes 232, wherein:

A locking device 30 is disposed at the end of the upper fork tube 21 and includes a switch assembly 31 and a driving rod 32. The switch assembly 31 comprises a sleeve 311 engaged with the inner portion of the upper end of the upper fork tube 21, a positioning base 312 fixed in the sleeve 311, a pole 313 slideably mounted on the positioning base 312, a positioning rod 314 mounted between the positioning base 312 and the pole 313, a button 315 mounted on the end of the pole 313 and protruded to the upper end of the sleeve 311, and a elastic member 316 mounted on the lower end of the pole 313 and against the inner wall of the sleeve 311. One end of the driving rod 32 is fixed to the lower end of the pole 313, and in the lower end of the driving rod 32 is formed an engaging groove 321 and a radial perforation 322, and the driving rod 32 is controlled to move axially within the upper fork tube 21 by the switch assembly 31.

A releasing pressure structure 40 is movably mounted on the end of the driving rod 32 of the locking device 30, which includes a C-shaped snap ring 41, a packing piece 42, an elastic member 43, a plug piece 44 with an engaging groove 441 thereof and a pin 45. The C-shaped snap ring 41 is engaged with the engaging groove 321 of the driving rod 32, the packing piece 42 and the elastic member 43 are engaged with the lower end of the driving rod 32 orderly, and the packing piece 42 is restricted by the C-shaped snap ring 41. The elastic member 43 is a compression spring for example, and the plug piece 44 is engaged with the end of the driving rod 32 by the engaging groove 441, and a sliding opening 442 is defined in the plug piece 44 radially and in communication with the engaging groove 441, And then the pin 45 is inserted into the sliding opening 442 and the radial perforation 322 so as to finish the assembling of the plug piece 44 and the driving rod 32, and the plug piece 44 is located above the passage 231 of the damper 23.

Figure 3:
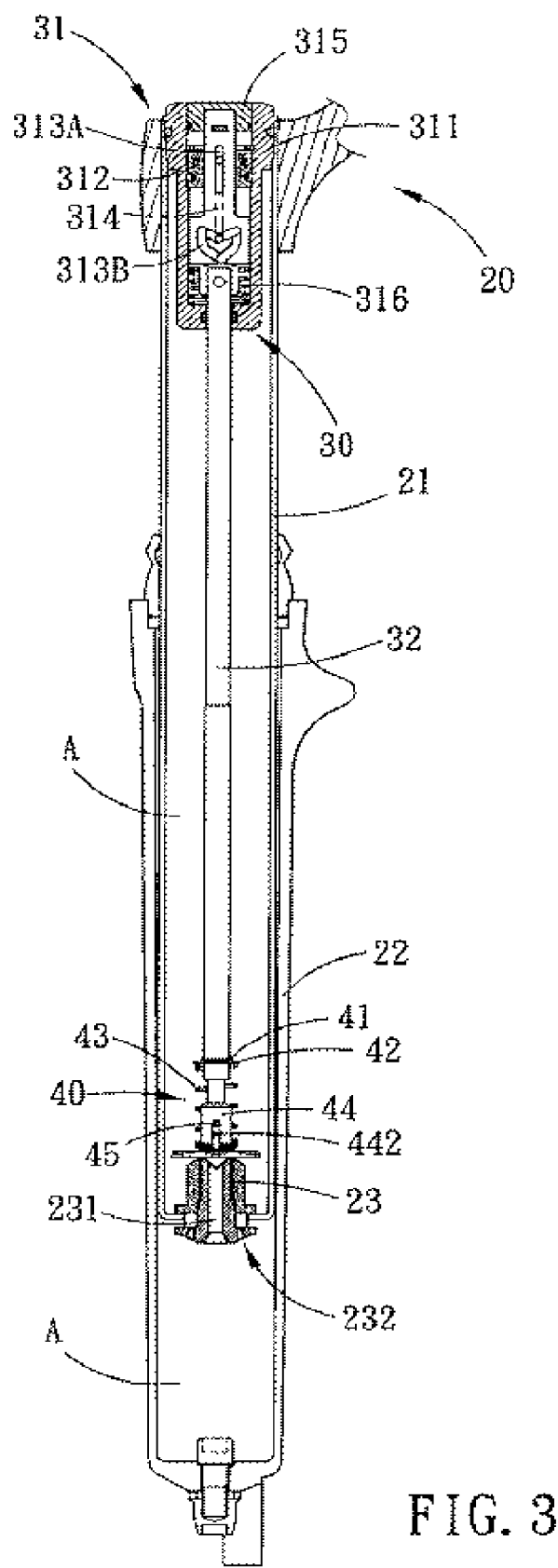
FIG. 3 is another cross sectional view of a locking device of a front fork without shock absorber effect in accordance with the present invention.
Figure 4:
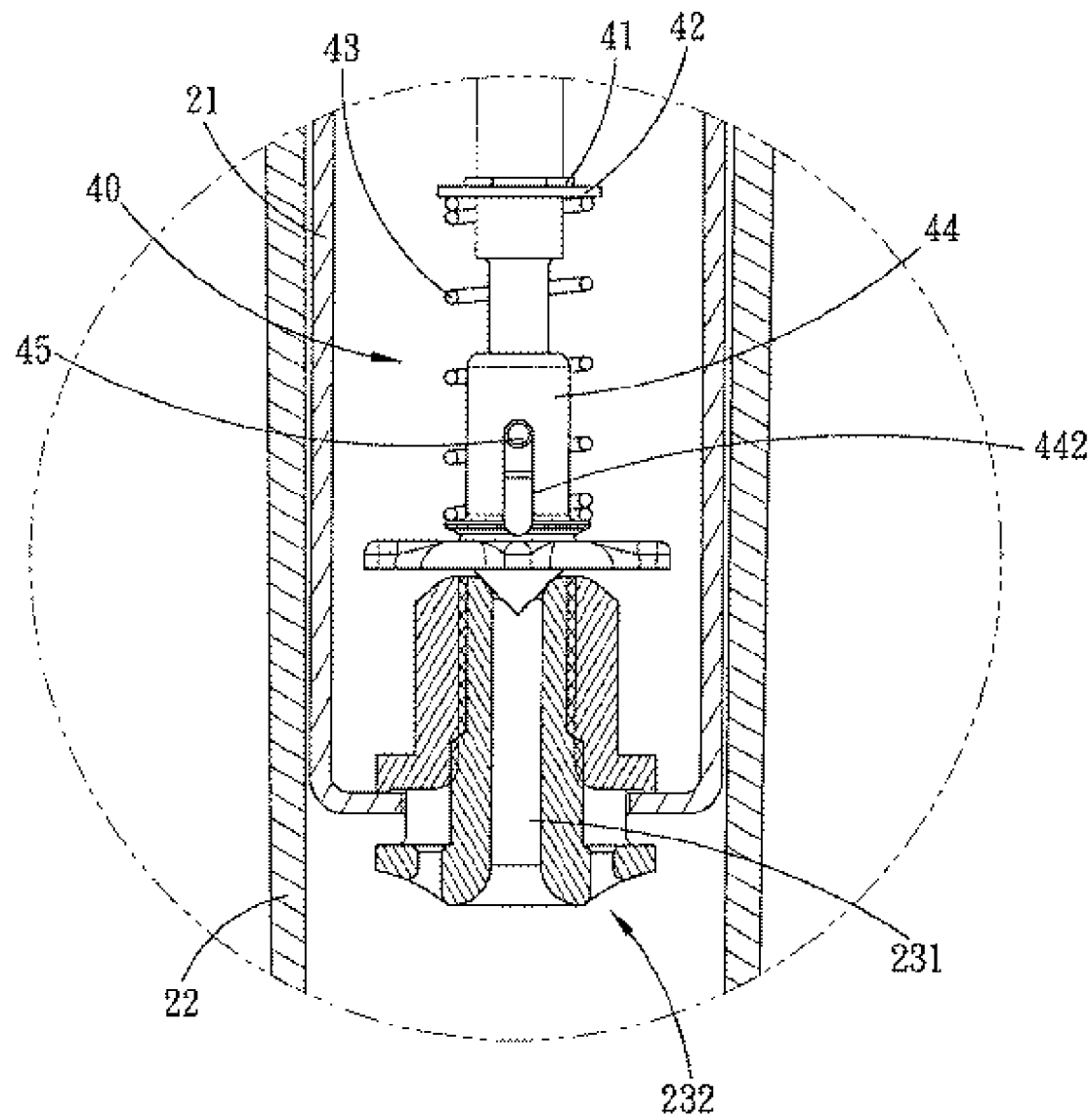
FIG. 4 is a partially enlarged view of FIG. 3.

Referring further to FIGS. 3 and 4, when wants to turn off shock proof function of the front fork 20, the user can press the button 315 of the switch assembly 31 in order to press the pole 313, so that a sliding groove 313A and a positioning groove 313B are moved relative to the positioning pole 314, and the positioning pole 314 will be positioned to the fixing point above the positioning groove 313B of the pole 313, and the compression spring 316 will be compressed and the driving rod 32 will be moved downwardly simultaneously. By such arrangement, the passage 231 that provided for flowing of the hydraulic oil of the damper 23 will be sealed by the plug piece 44 of the lower end of the driving rod 32 so as to finish the adjusting of the front fork 20 to make it without shock proof effect.

Figure 5:
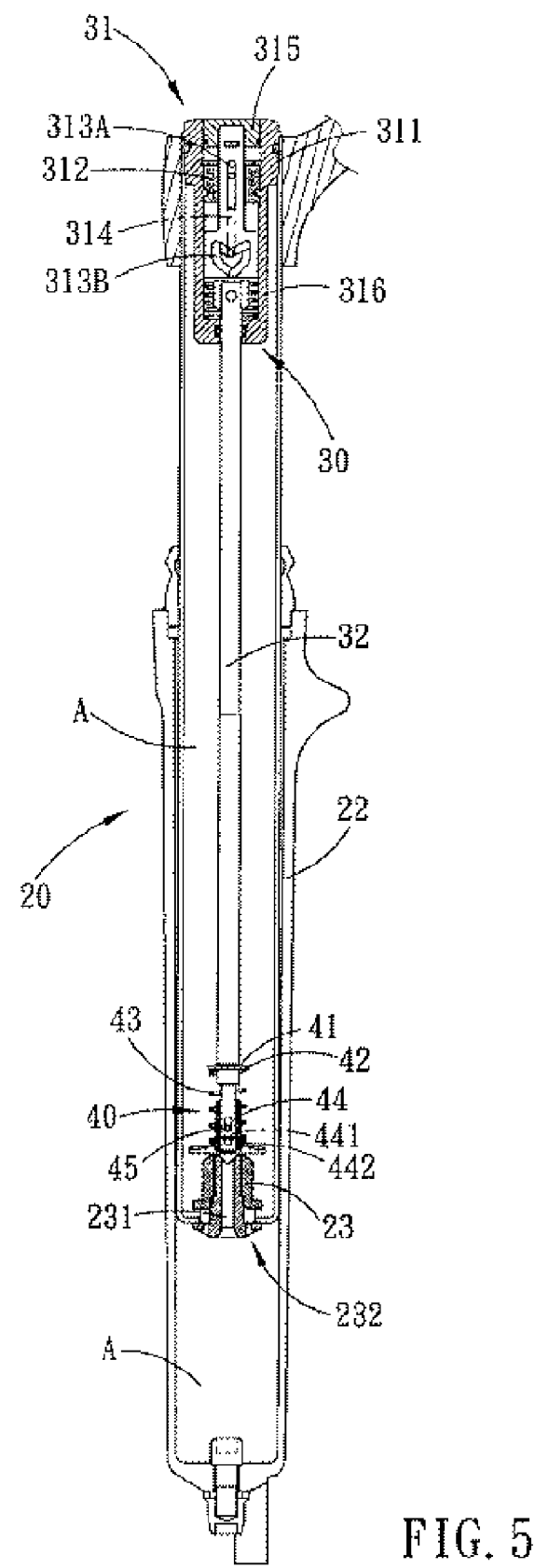
FIG. 5 is a further cross sectional view of a locking device of a front fork with shock absorber and releasing pressure structure therewith in accordance with the present invention.
Figure 6:
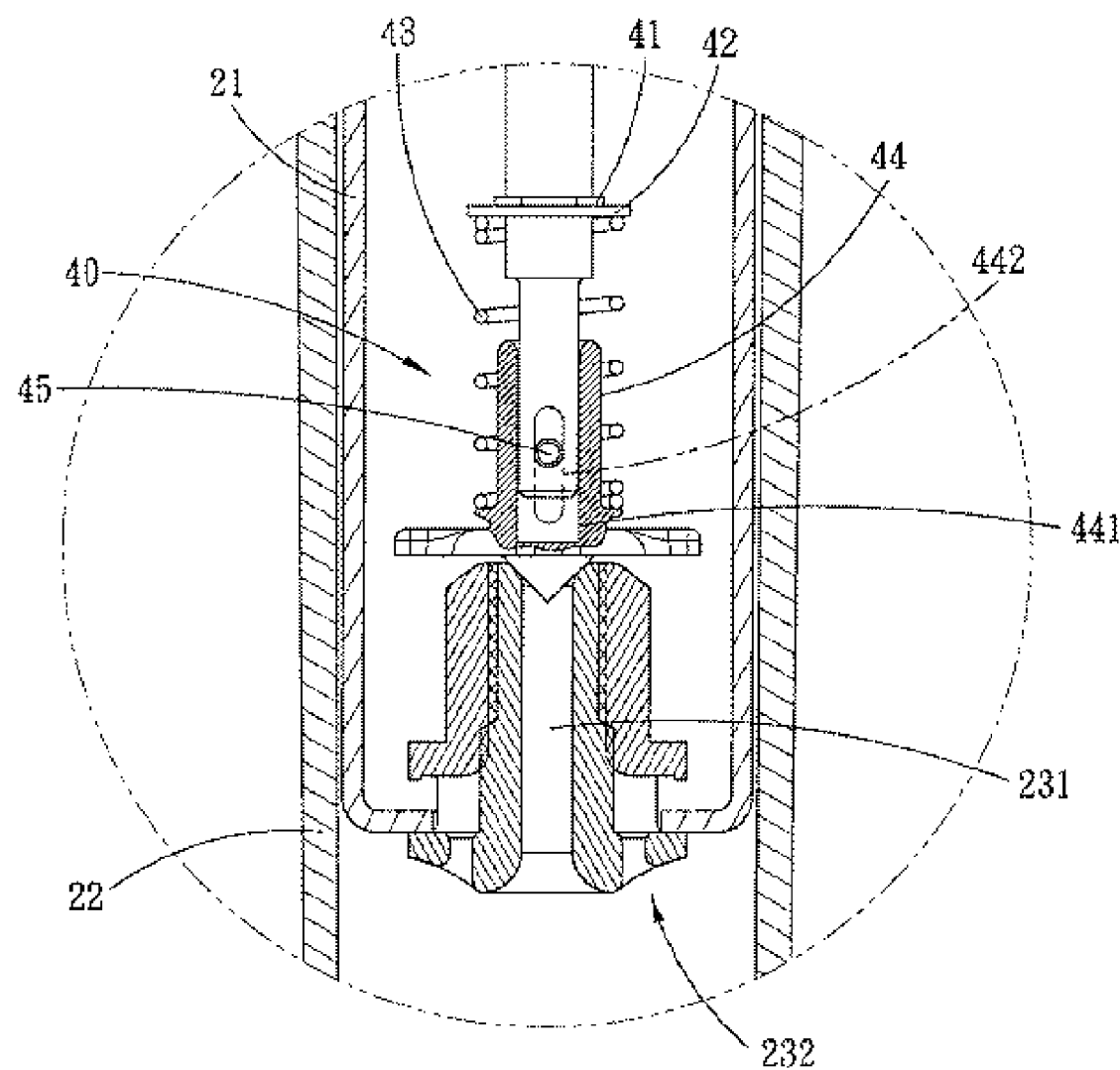
FIG. 6 is a partially enlarged view of FIG. 5.

Referring to FIGS. 5 and 6, when the front fork is set in a non-shock proof state, and accidented terrain, pit and so on that are came across so suddenly while riding that there's not enough time to turn on the buffering function of the front fork 20, at that time, the contact surface of the front wheel will transmit counterforce to the front fork 20. When the counterforce exceeds the threshold value of the pressure of the hydraulic oil A of the lower fork tube 22, that is the minimum value of a force that is capable of compressing the elastic member 43, and the damper 23 and the plug piece 44 will be moved upwardly together for compressing the elastic member 43, thereby the through holes 232 of the damper 23 are opened in order to make the hydraulic oil A of the lower fork tube 22 flow from the through holes 232 to the upper fork tube 21, so that the upper and lower fork tubes 21, 22 can be moved oppositely. Meanwhile, the plug piece 44 is moved with respect to the driving rod 32 axially, and the pin 45 is restrictedly moved by the sliding opening 442 of the plug piece 44. When the counterforce is reduced or less than the minimum force of compressing the elastic member 43, the elastic member 43 is pressed against the plug piece 44, and the damper 23 can be repositioned and the through holes 232 will be closed again.

Therefore, when users came across accidented terrain while riding and the front fork has no shock proof effect, the counterforce will be transmitted to the front fork 20, since the cooperating of the damper 23 and the releasing pressure structure 40, the upper and lower fork tubes 21, 22 can be moved oppositely so as to avoid damaging the members of the locking device 30. Thereby this invention is low costs and easily assembling.

While we have shown and described various embodiments in accordance with the present invention, it should be clear to those skilled in the art that further embodiments may be made without departing from the scope of the present invention.

What is claimed is:

1. A locking device of a front fork with shock absorber and releasing pressure structure therewith, the front fork comprising an upper fork tube and a lower fork tube being telescopically engaged with each other, and in a lower end of the upper fork tube being disposed a movable damper having a passage for flow of hydraulic oil and a plurality of through holes, wherein:

a locking device is disposed at an end of the upper fork tube and includes a switch assembly and a driving rod, the switch assembly drives the driving rod to move axially in the upper fork tube;

a releasing pressure structure includes a C-shaped snap ring, a packing piece, and elastic member, a plug piece with an engaging groove, and a pin and is movably disposed at an end of the driving rod of the locking device, the plug piece is provided for closing and opening the passage of the hydraulic oil of the damper and the through holes, when the damper is closed by the plug piece and when an oil pressure of the hydraulic oil of the lower fork tube exceeds a threshold value, the hydraulic oil will push the damper and the plug piece to move upwardly and to compress the elastic member, thus opening the through holes of the plug piece;

in a lower end of the driving rod is formed an engaging groove and a radial perforation;

the C-shaped snap ring is engaged with the engaging groove of the driving rod, the packing piece and the elastic member are mounted on a lower end of the driving rod orderly and restricted by the C-shaped snap ring, the engaging groove of the plug piece is engaged with the end of the driving rod, a radial sliding opening is defined in the plug piece and is in communication with the engaging groove, and the pin is inserted into the sliding opening of the plug piece and the radial perforation of the driving rod.

* * * * *